United States Patent

[11] 3,619,418

| [72] | Inventor | Ralph M. Lewis<br>Weston, Conn. |
|---|---|---|
| [21] | Appl. No. | 837,798 |
| [22] | Filed | June 30, 1969 |
| [45] | Patented | Nov. 9, 1971 |
| [73] | Assignee | Texaco Inc.<br>New York, N.Y. |

[54] STORING DESORBENT SEPARATED FROM ADSORPTION EFFLUENT
6 Claims, 1 Drawing Fig.

| [52] | U.S. Cl. | 208/310, 260/676 MS |
|---|---|---|
| [51] | Int. Cl. | C07c 7/12, C10g 25/04 |
| [50] | Field of Search | 208/310; 260/676 MS |

[56] References Cited
UNITED STATES PATENTS

| 3,309,415 | 3/1967 | Young et al. | 208/310 |
|---|---|---|---|
| 3,370,002 | 2/1968 | Cottle | 208/310 |
| 3,373,103 | 3/1968 | Cooper et al. | 208/310 |
| 3,395,097 | 7/1968 | Senn | 208/310 |
| 3,523,075 | 8/1970 | Stokeld | 260/676 |

Primary Examiner—Herbert Levine
Attorneys—K. E. Kavanagh and Thomas H. Whaley

ABSTRACT: Improved process for the separation of straight chain hydrocarbons from petroleum fractions containing same admixed with nonstraight chain hydrocarbons by a molecular sieve selective adsorbent of Type 5A structure wherein a first desorbing medium of relatively low purity with respect to its straight chain hydrocarbon content is used as the first desorbing medium of the process to produce a final desorbing medium having a relatively high purity in straight chain hydrocarbon content while producing straight chain hydrocarbon products.

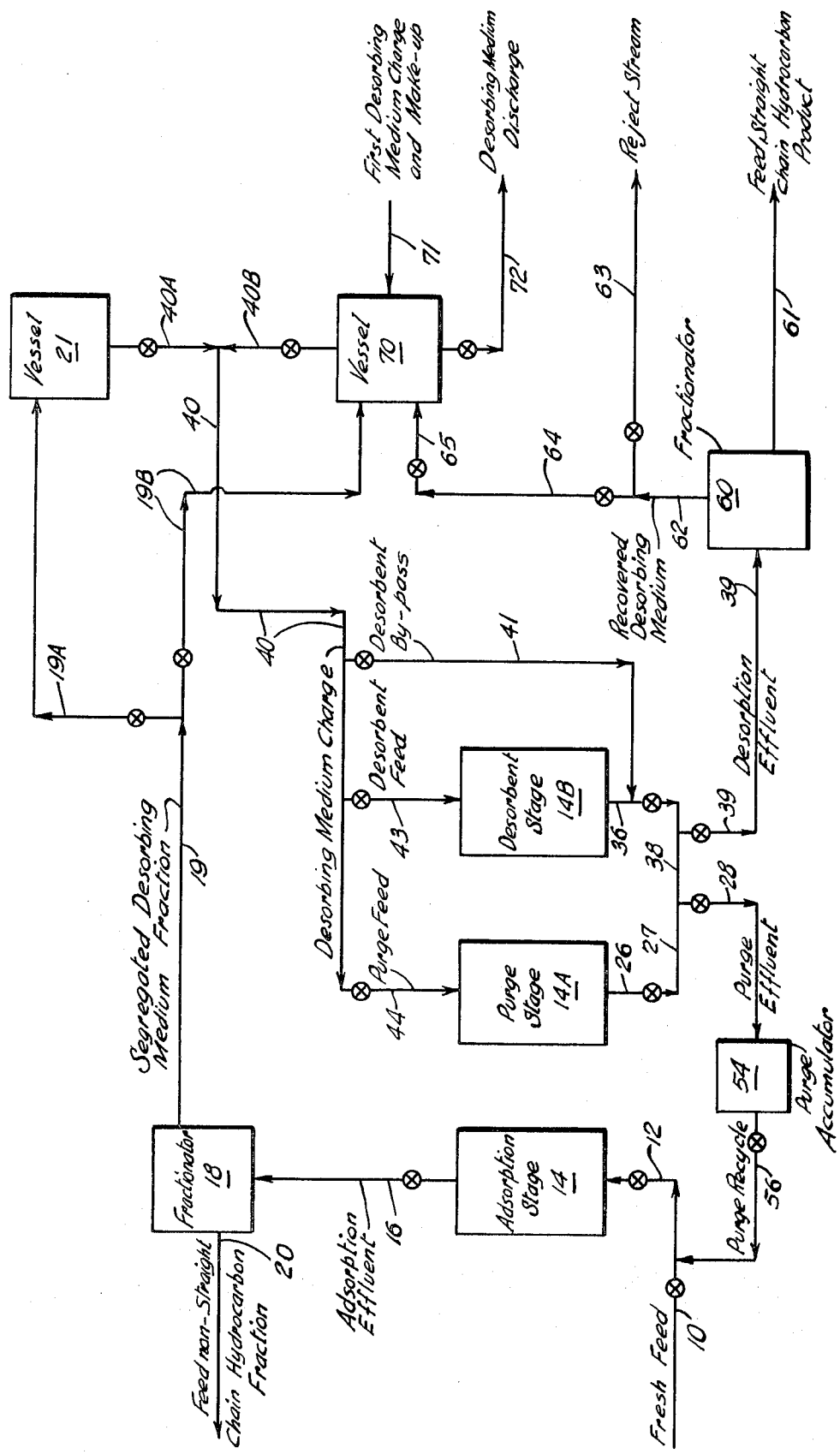

STORING DESORBENT SEPARATED FROM ADSORPTION EFFLUENT

The present invention is directed to a method of obtaining a high purity desorbing medium for use in a process of recovering straight chain hydrocarbons from petroleum fractions containing mixtures of straight chain and nonstraight chain hydrocarbons employing a molecular sieve selective adsorbent of Type 5A structure.

The separation of the straight chain hydrocarbon components of petroleum fractions containing mixtures thereof with nonstraight chain hydrocarbons by a molecular sieve selective adsorbent is known, for example, from U.S. Pat. No. 3,373,103.

In said separation process which is advantageously conducted at elevated temperature and at superatmospheric pressure, the straight chain hydrocarbon components are separated from the petroleum fraction by the molecular sieve selective adsorbent during an adsorption step. The separated straight chain hydrocarbon components adsorbed in the pores of the selective adsorbent are recovered therefrom by a suitable desorbing medium which is advantageously a straight chain hydrocarbon or a mixture of straight chain hydrocarbons having an average of from about one to three carbon atoms less than that of the lowest molecular weight straight chain hydrocarbon component contained in significant amounts in the fresh hydrocarbon feed to the adsorption vessel. By maintaining this difference in molecular weights effective and rapid desorption rates and ease of separation of the desorbing medium from the desired straight chain hydrocarbon product stream by fractionation are achieved.

A requirement of such a separation process is the availability of an adequate supply of the straight chain hydrocarbon desorbing medium having relatively high purity. The alternative methods of desorption, i.e. reduced pressure, inert gaseous desorbing media, nonstraight chain hydrocarbon desorbents, and the like, are not conducive to high quality and quantity products at commercially attractive prices. In many instances, a suitable source for the most efficient desorbing medium is either not available to the processor or is available only at the expense of other petroleum fractions from which the selected desorbing medium can be obtained by multiple fractionation and separations. Use of the process to first produce the required desorbing medium is not advantageous because in this period the production of desired straight chain hydrocarbon product is lost, with a resultant loss in revenue.

The present invention provides a method which enables the operator to obtain from the petroleum feed fraction the desired straight chain hydrocarbon desorbing medium of the high purity necessary for efficient operation in a rapid and efficient manner. A substantial quantity of the desired end product, namely, the high molecular straight chain hydrocarbon products is concomitantly produced.

The present invention comprises an improvement in the vapor phase separation of straight chain hydrocarbons from an admixture with nonstraight chain hydrocarbons, particularly $C_7$–$C_{24}$ straight chain hydrocarbons, and particularly preferably the $C_{10}$–$C_{20}$ straight chain hydrocarbons, by a molecular sieve selective adsorbent of Type 5A structure at an elevated temperature and superatmospheric pressure in a cyclic process comprising the sequential steps of adsorption, depressure, purge, repressure, desorption and depressure, wherein in the first desorbing step a first desorbing medium comprising a hydrocarbon mixture containing straight chain hydrocarbons in admixture with substantial amounts of nonstraight chain hydrocarbons is used and wherein said straight chain hydrocarbons of the first desorbing medium contain from one to three carbon atoms less than the lowest molecular weight straight chain hydrocarbon present in significant amounts in the hydrocarbon admixture, desorbed straight chain hydrocarbon components of said first desorbing medium are segregated from the resulting adsorption effluent from said next adsorption step as a segregated first desorbed desorbing medium fraction, said cycle and said segregation are repeated to provide said segregated fraction in an amount sufficient for desorption of said selective adsorbent in a subsequent desorption step, and thereafter said selective adsorbent is desorbed with said segregated first desorbed desorbing medium fraction. A further embodiment comprises mixing part of said segregated first desorbed desorbing medium fraction with part of said first desorbing medium to form an intermediate desorbing medium having a straight chain hydrocarbon content greater than said first desorbing medium, using said formed intermediate fraction as desorbing medium in a subsequent desorption step, in a subsequent adsorption step segregating from the adsorption effluent a segregated second desorbed desorbing medium, repeating said cycle and segregation to provide said segregated second desorbed desorbing medium fraction in an amount sufficient for desorption of said selective adsorbent, and thereafter in a subsequent desorption step desorbing said selective adsorbent with said segregated second desorbed desorbing medium fraction. A still further embodiment comprises using the mixed segregated first desorbed desorbing medium fraction and first desorbing medium as the desorbing medium in subsequent desorption steps of the process cycle.

How these and other objects of this invention are accomplished will become apparent with reference to the accompanying disclosure. In at least one embodiment of the invention at least one of the foregoing objects will be achieved.

By "straight chain" hydrocarbon is meant any aliphatic or acyclic or open chain hydrocarbon which does not possess side chain branching. Representative straight chain hydrocarbons are the normal paraffins and the normal olefins, mono- or polyolefins, including the straight chain acetylenic hydrocarbons. The "nonstraight chain" hydrocarbons comprise the aromatic and naphthenic hydrocarbons as well as the isoparaffinic, isoolefinic hydrocarbons and the like.

Straight chain hydrocarbon-containing mixtures which are suitably treated for the separation of straight chain hydrocarbons therefrom include the various petroleum fractions such as a naphtha or a gasoline fraction, a diesel oil fraction, a kerosene fraction, a gas oil fraction and the like. A typical hydrocarbon fraction which may be treated for the removal of straight chain hydrocarbons therefrom might have a boiling point or boiling range in the range 40°–700° F. and higher and contain a substantial amount of straight chain hydrocarbons, e.g. 2–35 percent by volume and higher. More particularly, a hydrocarbon fraction to be treated and containing straight chain hydrocarbons might have a boiling range of a $C_7$–$C_{24}$ hydrocarbon fraction. A hydrocarbon fraction treated for the removal of straight chain hydrocarbons therefrom might have the following composition:

| Hydrocarbon type | % by volume |
| --- | --- |
| Naphthenes | 0–75 |
| Aromatics | 0–50 |
| Acyclic saturates and unsaturates (including normal paraffins, isoparaffins, normal olefins and/or isoolefins) | 2–90 |

Typical refinery stocks or petroleum fractions which may be treated for the adsorptive separation of straight chain hydrocarbons therefrom are a wide boiling straight run naphtha, a heavy straight run naphtha, a light straight run naphtha, a catalytic cracked naphtha, a thermally cracked or thermally reformed naphtha, a catalytic reformed naphtha and the like, or a diesel oil or kerosene or gas oil fraction including mixtures thereof and wherein the hydrocarbon fraction or mixture may have been catalytically pretreated with hydrogen.

The practice of this invention is applicable to any solid selective adsorbent which selectively adsorbs straight chain hydrocarbons to the substantial exclusion of nonstraight chain hydrocarbons. This invention, however, is particularly applicable to a molecular sieve selective adsorbent comprising certain natural or synthetic zeolites or aluminosilicates, such as a calcium aluminosilicate, which exhibits the property of a molecular sieve, that is matter made up of porous crystals wherein the pores of the crystals are of molecular dimension and are of substantially uniform size. In general, zeolites may be described as water-containing aluminosilicates having a general formula

Wherein R may be an alkaline earth metal such as calcium, strontium or barium or even magnesium and wherein R' is an alkali metal such as sodium or potassium or lithium. Generally, these materials when dehydrated for the removal of substantially all of the water therefrom, retain their crystalline structure and are particularly suitable as selective adsorbents.

A particularly suitable solid adsorbent for straight chain hydrocarbons is a calcium aluminosilicate, apparently actually a sodium calcium aluminosilicate, marketed by Linde Co., and designated Linde Molecular Sieve Type 5A or 5A-45. The crystals of this particular calcium aluminosilicate have a pore size or opening of about 5A units, a pore size sufficiently large to admit straight chain hydrocarbons, such as the normal paraffins and the normal olefins, to the substantial exclusion of the nonstraight chain hydrocarbons, i.e., naphthenic, aromatic, isoparaffinic and isoolefinic hydrocarbons. This particular selective adsorbent is available in various sizes, such as in the form of ⅛ inch or 1/16 inch diameter extrusions, or as a finely divided powder having a particle size in the range of 0.5–5.0 microns. In general, a selective adsorbent employed in the practice of this invention may be in any suitable form or shape, granular, spheroidal or microspheroidal.

The method of the present invention should be carried out in the vapor phase and under essentially isothermal conditions. The particular operating conditions selected are dependent on the nature of the feed stream to the adsorption zone, the carbon number range of the feed stream and desired product stream as well as the carbon number distribution (relative amounts of each carbon number) within the range, the straight chain hydrocarbon content of the feed stream and the olefinic, sulfur, nitrogen and aromatic content thereof. In general, the feed stream preferably should be relatively low in olefins, sulfur, nitrogen and aromatic content and these impurities can be readily reduced to acceptable limits or removed in a manner well known in the art such as by mild hydrogenation involving mild catalytic reforming.

In the accompanying drawing, the single figure is a schematic flow diagram illustrating a preferred embodiment of the process of the present invention. For convenience of description of the process, reference numerals 14, 14A and 14B of the drawing designate a vessel containing molecular sieve at different steps or stages of the separation process, namely, during the adsorption step, the purge step and the desorption step, respectively. Although indicated as separate vessels in the drawing, a single vessel containing molecular sieve may be used to carry out the process.

With reference to the drawing in the first adsorption step a vaporized mixed petroleum fraction of straight chain and nonstraight chain hydrocarbons is introduced through lines 10 and 12 at an elevated temperature and pressure into the lower end of the vessel 14 containing a molecular sieve selective adsorbent normally free of an adsorbed material. The molecular sieve adsorbs in its inner pores the straight chain hydrocarbon components of the process feed stream while rejecting the nonstraight chain hydrocarbons. The nonstraight chain hydrocarbons pass from the adsorption zone through line 16 as the adsorption effluent to fractionator 18 and are withdrawn by way of line 20 as a fuel source. After the sieve pores are substantially saturated with adsorbed straight chain hydrocarbon components of the process feed stream the first adsorption step is terminated by stopping the flow of feed thereto in lines 10 and 12. The adsorption vessel 14 is then depressured to a reduced pressure not below atmospheric pressure by venting through lines 26, 27, 28 and accumulator 54. The depressured vessel is thereafter briefly purged at said reduced pressure in a purge step with a vaporized hydrocarbon stream having the same composition as the first desorbing medium, hereinafter more specifically defined. Reference numeral 14A refers to the adsorption vessel 14 during the depressure and purge steps. Purging is accomplished by passing from an external source not shown through line 71 to storage vessel 70 and from the vessel 70 a first desorbing medium, through lines 40B, 40 and 44 into vessel 14A and recovering the purge effluent therefrom by way of lines 26, 27 and 28 which is then passed to accumulator 54. From accumulator 54 the purge effluent at a reduced temperature and pressure is returned to the fresh feed in line 10 by way of line 56 for blending therewith prior to the next adsorption step. Line 71 also serves as a feed line for makeup first desorbing medium.

At the end of the purge step, the adsorption vessel 14A is repressured to a pressure greater than the adsorption pressure by continuing the flow of desorbing medium into vessel 14A after closing the valve in line 26 until the desired desorption pressure is attained. Thereafter in the first desorption step, the vessel, now referred to by reference numeral 14B, is contacted with first desorbing medium from storage vessel 70 by way of lines 40B, 40 and 43 to remove the adsorbed straight chain hydrocarbon components of the feed from the pores of the molecular sieve selective adsorbent. Desorbed straight chain hydrocarbon components of the feed together with some of the first desorbing medium now depleted in straight chain hydrocarbon content and hereinafter referred to as the "first lean desorbing medium fraction," are recovered as the first desorption effluent from vessel 14B by way of lines 36, 38 and 39 passed to fractionator 60. In fractionator 60, the desorbed straight chain hydrocarbon components of the feed are separated from the first lean desorbing medium fraction and recovered therefrom as a product stream by way of line 61. The first lean desorbing medium fraction may be passed from fractionator 60 to storage vessel 70 by way of lines 62, 64 and 65 for reuse, if desired. A bleed stream of this fraction can be withdrawn from line 64 by way of line 63.

In the first desorption step, a portion of the straight chain hydrocarbons of the first desorbing medium is adsorbed in the pores of the selective adsorbent, after displacing therefrom the adsorbed straight chain hydrocarbons of the fresh feed stream. At the conclusion of the first desorption step, the adsorption vessel is depressured to the adsorption pressure and the process cycle is repeated in sequence.

The expression "first desorbing medium" refers to a desorbing medium comprising hydrocarbons having from one to three carbons atoms less than the lightest straight chain hydrocarbon component in significant amounts of the fresh feed to the adsorption zone and of relatively low purity with respect to its straight chain hydrocarbon content. The first desorbing medium should have a boiling point range approximately that of the desired final desorbing medium. The purity of this first desorbing medium with respect to its straight chain hydrocarbon content may vary from about 20 to about 70–75 percent by weight, preferably in the range of 40–60 percent by weight.

In the second and any subsequent cycles of the precess and in the second adsorption step and any subsequent adsorption steps, the straight chain hydrocarbons of the fresh feed petroleum fraction introduced into the adsorption zone, desorb the adsorbed straight chain hydrocarbons of the first desorbing medium from the sieve pores and these desorbed straight chain hydrocarbons of the first desorbing medium, together with the nonstraight chain hydrocarbon components of the feed charge, are recovered as adsorption effluent and passed from vessel 14 by line 16 to fractionator 18. The desorbed straight chain hydrocarbons of the first desorbing medium hereinafter referred to as "segregated first desorbed desorbing medium fraction" are removed from fractionator 18 by way of lines 19 and 19A and passed therethrough to storage vessel 21 for subsequent use in the process.

The remaining steps of the second and subsequent cycles of the process are carried out as described above for the first cycle, except as noted.

The subsequent process cycles repeat these steps in sequence using the first desorbing medium with continued segregation of the segregated first desorbed desorbing medium fraction recovered from the adsorption effluent during a subsequent adsorption step or steps until a sufficient quantity of said segregated first fraction is obtained of the desired purity with respect to its straight chain hydrocarbon content, to permit use as the final desorbing medium of the process.

By segregating that portion of the first desorbing medium contained in the second adsorption effluent, i.e. the segregated first desorbed desorbing medium fraction during the second adsorption step, one can provide at least in part an inventory of the said segregated first fraction for use at the appropriate time in later processing cycles as the final desorbing medium.

In the process of the present invention assuming the sieve adsorbent is free from adsorbed desorbing medium components, it is necessary to complete at least one complete process cycle, i.e. adsorption-depressure-purge-repressure-desorption-depressure, and also an adsorption step in the second process cycle before one obtains any of the said segregated first desorbed desorbing medium fraction for use as the final desorbing medium since in the first cycle it is only during the first desorption step that the sieve bed is initially loaded with some of the straight chain hydrocarbons of the first desorbing medium. The number of cycles needed after the adsorption step of the second cycle to provide the required inventory of the segregated first desorbed desorbing medium is dependent on the initial concentration of the straight chain hydrocarbons in the first desorbing medium, and the quantity and concentration of straight chain hydrocarbons thereof required and/or desired for the final desorbing medium.

For example, if the initial concentration of straight chain hydrocarbons in the first desorbing medium is say 55 percent on a weight basis, and the desired concentration of straight chain hydrocarbons in the final desorbing medium is 75 percent by weight, at least one complete cycle plus a second adsorption step are needed to attain the desired purity of the segregated first fraction. However, the number of cycles needed to provide the desired inventory of said segregated first desorbed desorbing medium fraction is independent of purity and the process cycle must be repeated until a sufficient quantity of the segregated first fraction is attained.

A particular unobvious advantage of the process is the provision for segregation and concentration of a desired desorbing medium fraction while the process is also producing the desired straight chain hydrocarbon end products.

In the subsequent process cycles, during the succeeding adsorption steps, the heavier molecular weight straight chain hydrocarbon components of the fresh feed charged to the adsorption vessel continue to displace the adsorbed straight chain hydrocarbon components of the desorbing medium being used fraction the sieve pores that are left therein by the previous desorption step of the process. The resulting desorbed desorbing medium fractions obtained are also segregated from fractionator 18 and can be stored in vessel 21 as described above for later use. Consequently, the amount of segregated desorbed desorbing medium fraction in vessel 21 from the successive adsorption steps is gradually increased and continues to increase in each cycle until the desired quantity of this fraction is attained.

When the total quantity of the segregated first desorbed desorbing medium fraction collected in vessel 21 is sufficient to permit use of the said segregated first fraction, the resulting segregated first desorbed desorbing medium fraction can be used as the final desorbing medium for the remaining cycles of the process to produce the desired straight chain hydrocarbon end products.

When the segregated first desorbed desorbing medium fraction is used as the final desorbing medium of the process, one can first dispose of the desorbing medium in vessel 70 by way of discharge line 72. Then the valves in lines 40B and 40A are opened to permit the passage of the segregated first desorbing medium fraction from vessel 21 to vessel 70 for use as the final desorbing medium at the appropriate steps of the process.

A further embodiment of the invention is at the conclusion of the second adsorption step in the second cycle or after one or more adsorption steps, in any subsequent cycles but prior to buildup of the desired inventory of the segregated first desorbed desorbing medium at the desired final concentration is to employ some or all of the produced segregated first desorbed medium fraction as an intermediate desorbing medium in subsequent purge and desorption steps to produce an inventory of a second segregated desorbed desorbing medium fraction having a higher concentration of straight chain hydrocarbon components of the desorbing medium therein than said intermediate desorbing medium. This embodiment can be accomplished by opening the valve in line 72 to drain the storage vessel 70, then closing same and opening the valves in lines 40A and 40B to recharge vessel 70 with intermediate desorbing medium. The segregated second desorbed desorbing medium fraction is recovered in the same manner as the segregated first desorbed desorbing medium fraction and stored in vessel 21 for subsequent use as the final desorbing medium.

That portion of the intermediate desorbing medium recovered from product fractionator 60, i.e. part of the desorption effluent by way of lines 62 and 64 is then returned to vessel 70 after the valve in line 72 is closed. Thereafter until the desired amount of the segregated second desorbed desorbing medium fraction is obtained in vessel 21, the intermediate desorbing medium is taken from vessel 70 by way of lines 40B and 40.

A still further modification is to blend some of the first desorbing medium in tank 70 with part of the segregated first desorbed desorbing medium fraction in vessel 21 to provide a mixed desorbing medium having a straight chain hydrocarbon content intermediate to that of the segregated first fraction in tank 21 and the first desorbing medium in tank 70. Mixing can be accomplished by first discharging part of the first desorbing medium in vessel 70 through line 72, and opening the valves in lines 40A and 40B to permit passage of some of the segregated first fraction in vessel 21 to reach vessel 70.

An alternative method of mixing the two streams is to pass some of the segregated first desorbed desorbing medium fraction in line 19 by way of line 19A to vessel 21 and some by way of line 19B to vessel 70 for partial enrichment of the first desorbing medium in vessel 70. The intermediate desorbing medium may also be used as the final desorbing medium of the process in subsequent process cycles.

The mixed desorbing medium can be used to produce the segregated second desorbed desorbing medium in the same manner as previously described.

When the process is operated with the segregated first desorbed desorbing medium fraction or the segregated second desorbed desorbing medium fraction or the intermediate desorbing medium fraction as the final desorbing medium, further segregation of the desorbing medium portion of the succeeding adsorption effluent is not required. The segregated desorbed desorbing medium fraction in line 19 is passed to the storage vessel 70 by way of line 19B, after removal of any of the previously used desorbing medium in said vessel 70 by way of discharge line 72.

Countercurrent flow of the purge and desorption media with respect to the flow of fresh feed charge to the adsorption vessel during adsorption are essential to the process of this invention to assist in removing the straight chain hydrocarbons from the pores of the selective adsorbent.

In the following more detailed description of the various steps of the process, the description applies both to the first cycle of the process and the subsequent cycles.

The adsorption step in the process of the present invention is carried out with the feed stream being in the vapor phase.

The particular adsorption temperature used varies with the type of charge stock, carbon number content thereof, and desired range of the straight chain hydrocarbons to be recovered from the charge stock. However, it is necessary to carry out the adsorption step at a temperature above the dew point of the vaporized feed stream to minimize surface adsorption of the nonadsorbed hydrocarbons on the selective adsorbent and also to decrease the holdup of the charge stock in the sieve voids. A further requirement, which controls the upper temperature limit of the adsorption step is the need to avoid cracking of the charge stock. Keeping in mind these lower and upper temperature limitations, it has been found that a temperature range of about 575°–675° F. in the adsorption step will permit excellent separations.

In the adsorption step, the adsorption vessel should be maintained at a positive pressure above atmospheric pressure to permit the selective adsorbent to adsorb an additional quantity of normal straight chain hydrocarbons in the adsorption step. It has been found that maintaining the adsorption vessel at a pressure of between 10 to 50 p.s.i.g. during the adsorption step affords good results in terms of rapid adsorption of the adsorbable components of the feed stream by the selective adsorbent.

The charge stock is introduced into the adsorption vessel at a selected rate and the feed is continued until the selective adsorbent is loaded with normal straight chain components of the feed. Introduction of feed is preferably continued beyond the point at which the straight chain components of the feed begin to "breakthrough" into the adsorption effluent (nonadsorbed portion of the feed). Introduction of the feed into the adsorption vessel is preferably terminated when there is a "-normal paraffin overcharge" of between about 0.5 and 15 weight percent.

"Normal paraffin overcharge" is defined as the amount of n-paraffins in the feed stock to the adsorption vessel which is charged during the adsorption step in excess of the total amount on a weight basis of recovered normal paraffins during desorption and the normal paraffins recovered in the depressuring and purge effluent streams expressed as a percentage of normal paraffins charged. The utilization of the selective adsorbent at maximum efficiency is a material factor in the process of the present invention because it compensates for the less than complete desorption of the adsorbed straight chain hydrocarbons in the subsequent desorption step. The overcharge range of 0.5–15 weight percent is suitable for excellent sieve utilization in a short processing time.

After termination of the adsorption step the adsorption vessel is depressured in a depressuring step to a lower pressure than the adsorption pressure. This depressuring step is required to remove some of the surface adsorbed nonstraight chain hydrocarbons from the selective adsorbent and to also begin to remove from the adsorption vessel, particularly from the void spaces between the selective adsorbent, some of the unadsorbed portion of the charge stock while minimizing loss of the adsorbed straight chain hydrocarbons from the sieve pores.

The depressuring step is terminated when the adsorption pressure is decreased to about atmospheric pressure, and advantageously in the range of 0–10 p.s.i.g. The depressuring step is carried out at substantially the same temperature as was used in the adsorption step.

Following termination of the depressuring step, a purge step is begun using as the purge medium a vaporized stream of the material used as the desorbing medium. The purge step is carried out at substantially the same temperature as the adsorption and depressuring steps, and at the reduced pressure attained in the depressuring step. In this purge step a stream of the vaporized desorbing medium is introduced into the adsorption vessel in a direction countercurrent to the flow of the charge stock thereto. The purge medium removes the remaining portion of the charge stock from the adsorption vessel and the surface adsorbed nonstraight chain components from the selective adsorbent. In the purge step it is necessary to maintain the purge medium in the vapor state for efficient operation and the flow rate thereof at a value between 50 and 1,000 vapor hourly space velocity and the purge gas volume at a value between 0.1 and 10 volumes and wherein the ratio of the purge medium rate to the purge volume is at least 40/1 and up to about 7,000/1, preferably between 50 and 3,500/1 to minimize removal of the pore adsorbed straight chain components of the feed stream and to maximize removal of surface adsorbed and the bed-entrapped contaminating components. The term "vapor hourly space velocity" refers to the purge medium charge rate expressed as vapor volumes (at purge conditions) per hour per volume of adsorbent. The term "purge volume" refers to the amount of purge medium in the purge effluent stream per cycle and is equivalent to 1 vapor volume displacement (at purge conditions) of the total volume occupied by the sieve bed. Most efficient operations are conducted using a purge medium velocity of 170 to 680 vapor hourly space velocity and a purge medium volume of 0.2 to 4.0 and a purge medium rate to purge volume ratio of at least 50/1 when it is desired to attain exceptionally high n-paraffin product purity. The effluent from the purge step comprising purge medium, unadsorbed charge stock and surface adsorbed components of the charge stock together with some adsorbed straight chain hydrocarbon components of the fresh feed removed from the sieve pores by the purge medium is returned to the fresh feed line as a supplemental charge to the adsorption vessel. Routing of the purge effluent in this manner permits readsorption by the sieve of the normal straight chain hydrocarbon components of the feed that had been removed therefrom in the purge step. In addition the normal paraffins in the purge stream effluent are not lost to the process.

After completion of the purge step, the vessel is repressured to the desorption pressure which is advantageously about 20–75 p.s.i.g., and preferably about 1–20 p.s.i.g. above the highest pressure in the sieve vessel during the adsorption step. This repressuring step is necessary to permit more rapid desorption of the pore adsorbed straight chain components from the adsorbent and to facilitate removal of these components from the sieve by the particular desorbing medium used in the desorption step. The desorption pressure is attained by discontinuing the flow of the purge effluent stream to the purge accumulator via line 28, while continuing the flow of purge medium into the adsorption vessel. The rate of flow of the desorbing medium into the adsorption vessel is about 0.25–3 liquid hourly space velocity (LHSV) to remove the pore adsorbed straight chain hydrocarbons from the sieve. The desorption effluent comprising a mixture of desorbed straight chain hydrocarbons and desorbing medium is recovered from the adsorption vessel and then treated to separately recover the desorbing medium and the desorbed straight chain hydrocarbons.

In the desorbing step, the desorbing medium employed is essentially of the same composition as the purge medium. Use of the same hydrocarbon composition as the purge and desorption media avoids the problem of product contamination with other hydrocarbons while simplifying the processing requirements. Choice of a suitable desorbing medium for use in the practice of the present invention is largely dependent on the composition of the fresh feed, avails thereof and desired end product carbon number distribution. In general it has been found that most advantageous results are obtained when the desorption medium has a composition comprising a major amount of straight chain hydrocarbon or a mixture of straight chain hydrocarbons having an average of about one to three carbon atoms less than the lightest straight chain hydrocarbon in the fresh feed charge to the adsorption vessel. Maintaining a carbon number spread of about one to three between the purge-desorption media and the fresh feed charge lightest component permits effective and rapid desorption times in the process of the present invention in addition to affording ease of separation of the desorbing medium from the desired product stream by fractionation. Advantageously in the treatment of $C_{10}$–$C_{15}$ charge stocks, a final purge-desorption medium comprising about 80 percent by weight of normal heptane has been found to be satisfactory. In processing heavier stocks, e.g. $C_{14}$-$C_{20}$ containing stocks, a final desorption medium composed of 80–85 percent of $C_{10}$-$C_{12}$ straight chain hydrocarbon components has been found to give excellent results.

The present process uses in the desorption step a desorption medium space velocity of 0.25 to 3 LHSV and the desorption step is terminated when about 10–35 percent by weight of the pore adsorbed straight chain hydrocarbon components remain in the sieve pores.

In the desorption step the flow of desorbing medium into the adsorption zone is countercurrent to the fresh feed charge which preferably is upflow. By operating in this manner the lighter straight chain hydrocarbon components of the charge adsorbed in the pores of the adsorbent during the adsorption step are first desorbed, and, in turn, they assist the desorbing medium in desorbing of the adsorbed heavier straight chain hydrocarbon components nearer to the desorption outlet end of the vessel. Termination of the desorption step short of essentially complete removal of adsorbed straight chain hydrocarbons from the sieve pores permits the time of desorption to be materially decreased, i.e. in the order of 25–80 percent. Moreover, the throughput of the charge can be materially increased with the result that more charge stock can be treated per operating day and more product stream can be obtained.

At the termination of the desorption step, the adsorption vessel is depressured to the adsorption pressure and the cyclic operation is repeated.

While the above detailed description of the process of the present invention has referred to a single vessel operation for simplicity, it is within the purview of the invention to produce same on a multivessel basis, wherein one or more separate vessels are used in each of the main process steps, i.e. adsorption, purge and desorption while another set of vessels are on a regeneration cycle. Periodic regeneration of the selective adsorbent is needed to restore the activity thereof after use in the process for an extended processing period. Suitable regeneration techniques known in art such as, for example, the process disclosed in the Carter et al. U.S. Pat. No. 2,908,639 can be used.

The process of the present invention is essentially a timed cyclic process. It has been found that in cases where a relatively long desorption time is required satisfactory results have been achieved if the adsorption step is accomplished in about one-third of the total processing time, the remaining two-thirds being taken up by the balance of the processing steps, e.g. depressure, purge, repressure, desorption and depressure.

Under certain circumstances wherein the feed stock properties, carbon number distribution of straight chain hydrocarbon product, desorbing medium employed, etc., result in very short desorption times, it is more advantageous to accomplish the adsorption step in about one-half of the total processing time with the remaining one-half being taken up with the depressure, purge, repressure, desorption and depressure steps.

In a three vessel per set system, the time for the adsorption step is about one-third of the total cycle time and with a two vessel per set system the adsorption step time is equal to one-half of the total cycle time.

In the adsorption step, the valves in lines 26, 36, 41, 43 and 44 are in the closed position. At the termination of the adsorption step the valves in line 41 opens and permits the desorbing medium maintained in the lines 40 and 41 under pressure and at elevated temperature, to be bypassed around the adsorption vessel. At the same time the valve in line 26 is opened to decrease the pressure in the adsorption vessel 14A (before the purge step). Then the valve in line 44 is opened to permit passage of a stream of desorbing medium into vessel 14A for the purging step. At the completion of the purging step, the valve in line 26 is closed and the vessel is repressured by the flow of the stream of desorbing medium into the vessel until the desorption pressure is reached. The valves in lines 41 and 44 are then closed and the valves in lines 43 and 36 are opened substantially simultaneously with the closing of valves in lines 41 and 44. At the conclusion of the desorption step the valves in lines 43 and 36 are closed. Operating with this valve switching sequence permits the yield of high purity normal paraffins to be increased without damaging the sieve bed by pressure variations during this portion of the cycle. This embodiment further permits use of low purge volume displacements during the purge step and minimizes the loss of adsorbed normal paraffins from the sieve pores during the purge cycle.

In carrying out the process when a relatively long desorption time is required it has been found advantageous to employ a three sieve case system wherein one sieve case is on the adsorption step and the remaining two cases are on the desorption step (i.e. includes the depressure, purge, repressure and desorption steps). Operating with two cases on the desorption step permits a lower desorbing medium space velocity to be employed since the available desorption time is lengthened for a given total cycle time. The beneficial results obtained by operation in this manner include increased sieve utilization at a given desorption rate or lower desorption medium requirements at the same desorption rate. It is necessary to carry out desorption of the two sieve cases on the desorption step in parallel to prevent readsorption of the desorbed normal paraffins at the inlet of the second sieve case. Series desorption in the sieve cases is to be avoided for this reason.

Following is a description by way of example of a method of carrying out the present invention.

In this example the objective is to produce a final desorbing medium of 74.5 percent by weight $C_6$-$C_8$ straight chain hydrocarbons from a mixed petroleum fraction containing 55 percent by weight $C_6$-$C_8$ straight chain hydrocarbons.

EXAMPLE I

First Cycle

In the first process cycle a hydrotreated kerosene fraction having a boiling point range of 342° to 501° F. and containing 17.2 percent by weight of $C_{10}$-$C_{15}$ straight chain hydrocarbons is charged at a temperature of 600° F. and a pressure of about 16 p.s.i.g., and at a feed rate of 3,819 grams/hr. to the lower end of an adsorption vessel measuring 44 inches by 3 inches in diameter, having an internal volume of about 5.3 liters and containing about 4,630 grams of 1/16-inch extruded molecular sieve selective adsorbent, sold under the trade name Linde 5A–45 Molecular Sieve. There is recovered from the other end of the vessel an adsorption effluent stream at an average rate of 3,225 grams/hr., comprising 98.0 percent by weight $C_{10}$-$C_{15}$ nonstraight chain hydrocarbons and 2.0 percent by weight $C_{10}$-$C_{15}$ straight chain hydrocarbons. The initial adsorption effluent is separately recovered in a yield of 84.4 percent by weight basis fresh feed. In the adsorption vessel, the selective adsorbent adsorbs the straight chain hydrocarbon components of the feed. Flow of feed is continued until a total adsorption tie of 16.0 minutes elapses at which time there is a 10 percent overcharge of straight chain hydrocarbons therein. The feed into the adsorption vessel is then discontinued and the vessel depressured to about atmospheric pressure in 0.5 minute. After attaining the reduced purge pressure in a first purge step, a purge stream of first desorbing medium in the vapor state and comprising 55.0% by weight $C_6$-$C_8$ straight chain hydrocarbons, the balance being branched chain and cyclic paraffins in the 204° to 220° F. boiling range, is passed into the adsorption vessel at a rate of 170 vapor hourly space velocity (at purge conditions) and countercurrent to the direction of charge stock fed thereto. The flow of purge medium is continued until 2.6 purge volumes are used and the ratio of the purge rate to the purge volume is 65/1. The first purge effluent, comprising 19.9% by weight surface adsorbed materials, 45.6% by weight purge medium of 47% by weight purity, and 34.5% by weight of adsorbed straight chain hydrocarbons of the feed removed from the pores of the adsorbent, is removed at an average rate of 229 grams/hr., passed through a cooler-accumulator to reduce the temperature and pressure of the effluent to a value of about 90° F. and 2.5 p.s.i.g. and then introduced into the fresh feed line for return to the adsorption vessel on the next adsorption cycle.

After a purge period of about 0.9 minute, the flow of purge effluent from the adsorption zone is discontinued. In the first desorption step the first desorbing medium, having the same composition as the purge medium described hereinabove is passed into the adsorption vessel in the same direction as the purge medium (countercurrent to the feed on the adsorption step) at a rate of 0.6 LHSV Vo/hr/Va to repressure the vessel to the desorption pressure of about 25 p.s.i.g. The repressuring operation is completed in about 0.3 minute. The flow of first desorbing medium is continued for the remainder of the 30.6 minutes desorption step and there is recovered a first desorption effluent which on subsequent separation yields the following fractions: $C_{10}$–$C_{15}$ straight chain hydrocarbons from the feed, 15.5% by weight, basis fresh kerosene feed, 0.1% by weight $C_{10}$–$C_{15}$ nonstraight chain hydrocarbon, and 91.4% by weight of first lean desorbing medium fraction, basis fresh kerosene feed. The composition of the desorption effluent is a composition of 14.5% $C_{10}$–$C_{15}$ straight chain hydrocarbons, 0.1% of $C_{10}$–$C_{15}$ nonstraight chain hydrocarbons, balance 85.4% by weight first lean desorbing medium on a weight basis. The recovered first lean desorbing medium fraction has a composition of 50% by weight of $C_6$–$C_8$ straight chain hydrocarbons, balance $C_6$–$C_8$ nonstraight chain hydrocarbons. The yield of $C_{10}$–$C_{15}$ straight chain hydrocarbons recovered from the feed is 90.0% by weight, basis $C_{10}$–$C_{15}$ straight chain hydrocarbons in the fresh feed. The $C_{10}$–$C_{15}$ straight chain hydrocarbon product contained 99.6% by weight normal straight chain hydrocarbons. The average production rate of $C_{10}$–$C_{15}$ straight chain hydrocarbons is 594 grams/hr.

A slip stream of the lean desorbing medium fraction is drawn off from the system so that purity of the first desorbing medium is not depleted below about 55% by weight of $C_6$–$C_8$ straight chain components.

The flow of the first desorbing medium to the adsorption vessel is discontinued when about 80% of the pore adsorbed straight chain components of the feed are removed from the sieve pores. The vessel is depressured and switched to the adsorption step of the second cycle and the processing sequence is repeated.

SECOND CYCLE

In the second process cycle during the second adsorption step, there is passed to the adsorption zone fresh $C_{10}$–$C_{15}$ hydrocarbon feed at the same feed rate as the first cycle and, in addition, the mixed purge recycle stream from the purge step of the first cycle at a feed rate of 229 grams/hr. There is recovered a second adsorption effluent at a rate of 4,114 grams/hr. comprising 76.7% by weight of the $C_{10}$–$C_{15}$ nonstraight chain hydrocarbon components of the feed stream, 1.6% by weight $C_{10}$–$C_{15}$ straight chain hydrocarbon components of the feed, and 21.7% by weight of the $C_6$–$C_8$ straight chain hydrocarbon components of the first desorbed desorbing medium. The adsorption effluent is separated into the respective fractions and there is recovered a segregated first desorbed desorbing medium fraction having a purity of 74.5% by weight of $C_6$–$C_8$ straight chain hydrocarbons at a rate of 889 grams/hr. The effluents from the purge and desorption steps in this second cycle are of the same composition and rates as in the first cycle.

ADDITIONAL CYCLES

After 72 additional cycles (74 total cycles), the quantity of the segregated first desorbed desorbing medium fraction recovered during the succeeding adsorption steps of the process attained a volume of 75,700 ml., sufficient to permit use of the segregated first fraction as the final desorbing medium in the process. Thereafter the flow of first desorbing medium during succeeding purge and desorption steps of the process cycle is discontinued, and the segregation of the first desorbed desorbing medium from the adsorption effluent is discontinued, and this fraction is returned to the desorbing medium storage vessel. The first desorbed desorbing medium fraction is used in the purge and desorption steps as the desorbing medium of subsequent process steps.

EXAMPLE 2

In this example 2, the objective is to produce a final desorbing medium of 85% by weight $C_6$–$C_8$ straight chain hydrocarbons, from a 55% by weight $C_6$–$C_8$ straight chain hydrocarbon fraction. Use of the segregated second desorbed desorbing fraction as the final desorbing medium results in increased desorption efficiency and increased rate of production of $C_{10}$–$C_{15}$ straight chain hydrocarbon product.

The procedure of example 1 is repeated as described above and continued for a total of 130 process cycles to provide the segregated first desorbed desorbing medium fraction of 74.5% by weight $C_6$–$C_8$ straight chain hydrocarbons in an amount of 134,500 ml.

The unused first desorbing medium (55% purity) of example 1 is withdrawn from the desorbing medium storage vessel 70. The vessel is then charged with the produced 74.5% purity segregated first fraction from vessel 21 by way of lines 40A and 40B.

The process cycle is continued using the 74.5% purity segregated fraction as the second desorbing medium in the 131st cycle and subsequent cycles for the purge and desorption steps for an additional 74 cycles.

As the segregated second desorbed desorbing fraction is produced, the purity of the second desorbing medium in vessel 70, is decreased from its 74.5% initial purity to a final purity of 61% by weight. The average purity of the second desorbing medium in vessel 70 through the 74 cycles is 67.7% by weight, and the final purity of the segregated second desorbed desorbing medium fraction in vessel 21 is 85% by weight of $C_6$–$C_8$ straight chain hydrocarbons.

In the adsorption step the average feed rate is 4,302 grams/hr. of fresh feed and 258 grams/hr. of the purge recycle stream. The average adsorption time is 14.2 minutes, and the average times for the depressure, purge, repressure, desorption steps are 0.5, 0.9, 0.3, and 26.7 minutes, respectively. The average total time per complete cycle is 42.6 minutes. The average adsorption effluent rate is 4,635 grams/hr. comprising 74 grams/hr. of $C_{10}$–$C_{15}$ straight chain hydrocarbons, 3,560 grams/hr. of $C_{10}$–$C_{15}$ nonstraight chain hydrocarbons, and 1,001 grams/hr. of second desorbed desorbing medium of 85% by weight purity with respect to $C_6$–$C_8$ straight chain hydrocarbons. The average purge effluent stream rate is 258 grams/hr. comprising 19.8% by weight surface adsorbed materials, 45.6% by weight purge medium having an average unity of 66.2% by weight and 34.6% by weight of adsorbed $C_{10}$–$C_{15}$ straight chain hydrocarbons of the feed.

The average desorption effluent on separation provided the following fractions: 15.5% by weight $C_{10}$–$C_{15}$ straight chain hydrocarbons, and 0.1% by weight $C_{10}$–$C_{15}$ nonstraight chain hydrocarbons, basis fresh feed; 77.4% by weight second lean desorbing medium, basis fresh kerosene. The average composition of the desorption effluent is 16.7% by weight $C_{10}$–$C_{15}$ straight chain hydrocarbons, 0.1% by weight $C_{10}$–$C_{15}$ nonstraight chain hydrocarbons, and 83.2% by weight of second lean desorbing medium. The second lean desorbing medium fraction is composed of 62.5% by weight $C_6$–$C_8$ straight chain hydrocarbons.

The yield of $C_{10}$–$C_{15}$ straight chain hydrocarbons is 90.0% by weight, basis $C_{10}$–$C_{15}$ straight chain hydrocarbon in the fresh feed, and had a purity of 99.6% by weight. The average product rate of $C_{10}$–$C_{15}$ straight chain hydrocarbons is 669 grams/hr.

After a grand total of 204 cycles, the resulting segregated second desorbed desorbing medium fraction volume is 75,700 ml. of 85% by weight purity $C_6$–$C_8$ straight chain hydrocarbons. This produced fraction is used in subsequent cycles as the final desorbing medium.

COMPARATIVE EXAMPLE A

In this comparative example, the procedure of example 1 is followed except that the desorbed desorbing medium fraction separated from the adsorption effluent is not kept segregated from the first desorbing medium. This segregated desorbed desorbing medium fraction is returned to desorbing medium vessel 70 by way of lines 19 and 19B. In the purge and desorption steps of this example, the desorbing medium contained an average of 85% by weight of $C_6$–$C_8$ straight chain hydrocarbons.

In the adsorption step, over a 13.0 minute adsorption period, the average fresh $C_{10}$–$C_{15}$ hydrocarbon feed rate in 4,701 grams/hr., and the average purge recycle feed rate is 282 grams/hr. The average adsorption effluent rate is 5,064 grams/hr., having a composition of 76.8% by weight $C_{10}$–$C_{15}$ nonstraight chain hydrocarbons, 1.6% by weight $C_{10}$–$C_{15}$ straight chain hydrocarbons, and 21.6% by weight of $C_6$–$C_8$ desorbed desorbing medium. On fractionation, the recovered desorbed desorbing medium was recycled to the desorbing medium vessel 70.

The desorption time is 24.6 minutes and the total cycle time is 39.0 minutes. The average purge effluent comprises 19.9% by weight surface adsorbed materials, 34.2% by weight purge medium of average 82% by weight purity, and 45.9% of $C_{10}$–$C_{15}$ straight chain hydrocarbons of the feed removed from the sieve pores in the purge step.

The average desorption effluent on fractionation yields the following fractions: 15.5% by weight $C_{10}$–$C_{15}$ straight chain hydrocarbons from the feed, 0.1% by weight $C_{10}$–$C_{15}$ nonstraight chain hydrocarbons and 67.9% by weight of the desorbing medium, basis fresh feed. The average composition of the desorption effluent is 18.6% by weight $C_{10}$–$C_{15}$ straight chain hydrocarbons, 0.1% by weight $C_{10}$–$C_{15}$ nonstraight chain hydrocarbons, 81.3% by weight lean desorbing medium.

The average yield of $C_{10}$–$C_{15}$ straight chain hydrocarbons is 90.0% by weight of 99.6% purity.

The following table summarizes the results of the above examples.

| | Average desorbing medium concentration, percent | Operating hours | Grams/hour $C_{10}$–$C_{15}$ product rate | $C_{10}$–$C_{15}$ product grams | Total grams |
|---|---|---|---|---|---|
| Example: | | | | | |
| A | 85 | [1] 84.4 | 731 | 61,800 | 61,800 |
| 2 | 67.7 | 51.6 | 669 | 34,550 | 96,150 |
| 1 | 55 | 103.8 | 594 | 61,600 | |

[1] This time period is equal to the sum of the operating hours in Examples 1 and 2, 155.4 hours, less the 71 hours required to produce the 85% desorbing medium by the process from a petroleum feedstock. No $C_{10}$–$C_{15}$ straight chain hydrocarbon products can be produced while the process is employed to produce this desorbing medium.

The above table shows that in the total time required to produce the final desorbing medium in examples 1 and 2, 155 hours, one also obtains 96,150 grams/hr. of desired $C_{10}$–$C_{15}$ straight chain hydrocarbon product, whereas if the final desorbent is first made by the process (requiring 71 hours) and then the process is switched to production of the $C_{10}$–$C_{15}$ straight chain hydrocarbons for 84.4 hours (comparative example A), a net loss of 34,350 grams/hr. of $C_{10}$–$C_{15}$ product occurs over the same time period. A further advantage of the improved process of the invention is that the processor does not incur the expense of purchasing the relatively high purity desorbing medium for the process of diverting some from his avails for this purpose.

Obviously, many modifications and variations of the invention as hereinbefore set forth may be made without departing from the spirit and scope thereof and therefore only such limitations should be imposed as are indicated in the appended claims.

I claim:

1. In the vapor phase separation of relatively high molecular weight straight chain hydrocarbons from a feed admixture with nonstraight chain hydrocarbons by a molecular sieve selective adsorbent of Type 5A structure at an elevated temperature and super atmospheric pressure in a cyclic process comprising the sequential steps of adsorption, depressure, purge, repressure, desorption and depressure, the improvement comprising employing in the first desorption step a first desorbing medium comprising a hydrocarbon mixture containing straight chain hydrocarbons in admixture with substantial amounts of nonstraight chain hydrocarbons and wherein said hydrocarbons of the first desorbing medium contain from one to three carbon atoms less than the lowest molecular weight straight chain hydrocarbon present in significant amounts in the admixture, in the next adsorption step segregating from the resulting adsorption effluent desorbed straight chain hydrocarbon components of said first desorbing medium as a segregated first desorbed desorbing medium fraction, said segregated first desorbed desorbing medium fraction having a straight chain hydrocarbon content richer than the straight chain hydrocarbon content of said first desorbing medium, repeating said cyclic process and said segregation to provide said segregated first fraction in an amount sufficient for the desorption of said selective adsorbent in a subsequent desorption step, and thereafter desorbing said selective adsorbent with said segregated first desorbed desorbing medium fraction while concomitantly producing relatively high molecular weight straight chain hydrocarbon product from the feed admixture by said process.

2. A process as claimed in claim 1 wherein a portion of said segregated first desorbing medium fraction is admixed with a portion of said first desorbing medium thereby producing an intermediate desorbing medium richer in straight chain hydrocarbon content than said first desorbing medium, said intermediate desorbing medium is employed as desorbing medium in a subsequent desorption step of the cyclic process, in a subsequent adsorption step, segregating a segregated second desorbed desorbing medium fraction having a straight chain hydrocarbon content richer than said segregated first desorbed desorbing medium fraction from the resulting adsorption effluent, repeating said cycle and segregation to provide said segregated second desorbed desorbing medium fraction in an amount sufficient for desorption of said selective adsorbent and thereafter in a subsequent desorption step desorbing said selective adsorbent with said segregated second desorbed desorbing medium fraction.

3. A process as claimed in claim 1 wherein at least a portion of said segregated first desorbed desorbing medium fraction is admixed with a portion of said first desorbing medium, and the resulting admixed desorbing medium mixture is employed as the desorbing medium in the desorption step of a subsequent process cycle.

4. A process as claimed in claim 1 wherein said segregated first desorbed desorbing medium fraction is employed as desorbing medium in a subsequent desorption step of the cyclic process, in a subsequent adsorption step segregating a segregated second desorbed desorbing medium fraction having a straight chain hydrocarbon content richer than said segregated first desorbed desorbing medium from the resulting adsorption effluent, repeating said cycle and said segregation to provided said segregated first desorbed desorbing medium fraction in an amount sufficient for desorption of said selective adsorbent and thereafter in a subsequent desorption step desorbing said selective adsorbent with said segregated second desorbed desorbing medium fraction.

5. A process as claimed in claim 1 wherein the concentration of straight chain hydrocarbons in said first desorbing medium is about 50 to about 60% by weight, and the concentration of straight chain hydrocarbons in said segregated first desorbed desorbing medium fraction is 70–79% by weight.

6. A process as claimed in claim 1 wherein the first desorbing medium contains from 50–70% by weight of normal heptane.

\* \* \* \* \*

PO-1050
(5/69)

UNITED STATES PATENT OFFICE
CERTIFICATE OF CORRECTION

Patent No. 3,619,418          Dated November 9, 1971

Inventor(s) Ralph M. Lewis

It is certified that error appears in the above-identified patent and that said Letters Patent are hereby corrected as shown below:

Col. 1, line 58   Change "$C_2$" to --$C_7$--
Col. 4, line 61   Change "precess" to --process--
Col. 5, line 57   Change "fraction" to --from the--
Col. 13, line 18  Change "in" to --is--
Col. 14, line 64  Change "first" to --second--

Signed and sealed this 30th day of May 1972.

(SEAL)
Attest:

EDWARD M. FLETCHER, JR.          ROBERT GOTTSCHALK
Attesting Officer                Commissioner of Patents